US010661788B2

(12) United States Patent
Grewe (10) Patent No.: US 10,661,788 B2
(45) Date of Patent: May 26, 2020

(54) VEHICLE CONTROL DEVICE AND METHOD

(71) Applicant: Continental Teves AG & Co. oHG, Frankfurt (DE)

(72) Inventor: Ralph Grewe, Frankfurt am Main (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 178 days.

(21) Appl. No.: 15/664,713

(22) Filed: Jul. 31, 2017

(65) Prior Publication Data

US 2017/0341644 A1 Nov. 30, 2017

Related U.S. Application Data (63) Continuation of application No. PCT/DE2016/200057, filed on Jan. 28, 2016.

(30) Foreign Application Priority Data

Jan. 29, 2015 (DE) .................. 10 2015 201 569

(51) Int. Cl.
*B60W 30/09* (2012.01)
*B60W 30/12* (2020.01)
(Continued)

(52) U.S. Cl.
CPC ............ *B60W 30/09* (2013.01); *B60W 30/12* (2013.01); *B60W 40/04* (2013.01); *G05D 1/0088* (2013.01);
(Continued)

(58) Field of Classification Search
None
See application file for complete search history.

(56) References Cited

U.S. PATENT DOCUMENTS 6,687,585 B1  2/2004 Rizzoni et al.
8,364,310 B2* 1/2013 Jones ................. B25J 5/007
                                              318/568.12
(Continued)

FOREIGN PATENT DOCUMENTS

DE    19838336 A1   3/2000
DE    10354659 A1   6/2005
(Continued)

OTHER PUBLICATIONS

International Search Report and Written Opinion dated Jul. 14, 2016 from corresponding International Patent Application No. PCT/DE2016/200057.
(Continued)

*Primary Examiner* — Thomas G Black
*Assistant Examiner* — Demetra R Smith-Stewart (57) ABSTRACT

The present invention relates to a vehicle control device for a vehicle, comprising a number of first control devices which are independent of each other and are arranged in a first logical level and designed to calculate predetermined first vehicle control functions and to output first calculation results, a number of further control devices which are independent of each other, are arranged in a number which is superordinate from the first logical level and hierarchically arranged among each other and are designed to calculate further predetermined vehicle control functions and to output further calculation results. According to the invention, the further control devices are designed to use calculation results only of those control devices as input variables for the corresponding vehicle control functions which are arranged in logical levels hierarchically below the logical level of the respective control device.

15 Claims, 3 Drawing Sheets (51) Int. Cl.
*B60W 40/04* (2006.01)
*G05D 1/00* (2006.01)
*B60W 50/00* (2006.01)

(52) U.S. Cl.
CPC . *B60W 2050/0006* (2013.01); *B60W 2520/06* (2013.01); *B60W 2720/106* (2013.01); *B60W 2720/125* (2013.01)

(56) References Cited

U.S. PATENT DOCUMENTS

| | | | |
|---|---|---|---|
| 2002/0183911 | A1 | 12/2002 | Tashiro et al. |
| 2009/0295559 | A1 | 12/2009 | Howell et al. |
| 2012/0083924 | A1* | 4/2012 | Jones ................ B25J 5/007 700/258 |
| 2013/0325306 | A1* | 12/2013 | Caveney .......... B60W 30/0953 701/117 |
| 2016/0347326 | A1* | 12/2016 | Iwagami .............. B60W 10/06 |

FOREIGN PATENT DOCUMENTS

| | | |
|---|---|---|
| DE | 112009001371 | 4/2011 |
| DE | 102011108292 A1 | 4/2012 |
| EP | 1550573 A1 | 7/2005 |
| JP | 2009113506 A | 5/2009 |
| WO | WO2007107361 A1 | 9/2007 |

OTHER PUBLICATIONS

German Search Report dated Nov. 5, 2015 for corresponding German Patent Application No. 10 2015 201 569.6.
Japanese Office Action dated Jan. 8, 2020 for corresponding patent application No. 2017-523782.

* cited by examiner

FIG 1

VEHICLE CONTROL DEVICE AND METHOD

CROSS-REFERENCE TO RELATED APPLICATIONS

This application claims the benefit of PCT International application No. PCT/DE2016/200057, filed Jan. 28, 2016, which claims priority to German patent application No. 10 2015 201 569.6 filed Jan. 29, 2015, each of which is hereby incorporated by reference herein.

FIELD OF THE INVENTION

The present invention relates to a vehicle control device for a vehicle and a corresponding method.

BACKGROUND

Although in the following the present invention is described in connection with cars, it is not restricted to the latter and can be used for any type of vehicle.

In modern vehicles, driver assistance systems are used which are increasingly complex. For such driver assistance systems and functions, such as e.g. highly-automated driving, a large number of sensors are required in the vehicle which enable the accurate detection of the vehicle surroundings. In order to control the vehicle autonomously, it is necessary, for example, to recognise traffic lanes reliably, so that the vehicle can be driven within an identified traffic lane.

In modern assistance systems, fusion concepts are being developed for the environment sensors. A representation of the vehicle surroundings, the so-called environment model, is created from different data sources, e.g. radar sensors, cameras, driving dynamics sensors, GPS and digital cards. The aim of data fusion is to achieve greater precision and safety as well as a greater field of vision relative to individual data sources.

In particular, with regard to highly-automated driving a high degree of system availability is necessary. The focus of the fusion architecture used today is to improve the precision and field of vision and increase the safety of detection.

The high degree of interconnection between the individual components or software modules means that if one individual module fails this easily impairs the functionality of the whole system.

However, this is inconsistent with high system availability, which is necessary for automated driving.

For example, the calculation of the vehicle position is currently based on the ESC sensor cluster (ESC: Electronic Stability Control) and is used by modules such as object tracking and occupancy grids. If the ESC sensor cluster fails or the positioning module contains an error, all of the other modules are also affected and the whole system fails.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Therefore, the objective of the present invention is to improve the control of a vehicle.

A vehicle control device for a vehicle is provided, comprising a number of, i.e. one or more first control devices which are independent of one another and are arranged on a first logical level and designed to calculate predetermined first vehicle control functions and to output first calculation results, a number of further control devices which are independent of one another are arranged on a number of logical levels superordinate to the first logical level and below one another hierarchically and are designed to calculate predetermined additional vehicle control functions and to output additional calculation results, wherein the further control devices are designed to use calculation results only of those control devices as input variables for the corresponding vehicle control functions which are arranged in logical levels hierarchically below the logical level of the respective control device.

Furthermore, a method for controlling a vehicle, comprises arranging a number of, i.e. one or more first independent control devices in a first logical level, calculating predefined first vehicle control functions in the first control devices, arranging a number of further independent control devices in a number of logical levels superordinate to the first logical level and arranged below one another and calculating further predetermined vehicle control functions in the further independent control devices based on the calculation results of only those vehicle control functions which are arranged in control devices in logical levels, which are arranged hierarchically below the logical level of the control device of the respective vehicle control function.

The close linking of superordinate functions with the underlying sensors results in a high degree of dependency of the individual system components on one another. Then taking this finding into account and breaking these dependencies by subdividing the calculations for controlling the vehicle into several logical levels. Within each level there is no interconnection between the individual functions or control devices. The individual control devices are thus independent of one another. If one of the components fails, the other control devices of the respective level remain functional.

Add-on functions can be assigned to the corresponding logical levels. The functions at low logical levels can include, for example, only incomplete and insecure information about the vehicle surroundings and can therefore only have limited capabilities. With each superordinate logical level the data quality increases and thus the functional scope and functional quality can be improved.

Logical levels are defined to mean that the functions or control devices of a logical level are not interconnected with one another and the functions or control devices of a first logical level only access data of functions or control devices of a second logical level which is arranged hierarchically below the first logical level. The logical levels are, however, not a physical arrangement of the individual control devices.

In one embodiment the control devices are designed to control the vehicle by means of the respective calculation results, in particular a lateral acceleration and/or a longitudinal acceleration of the vehicle. This enables a separate control of the vehicle on different logical levels based on the available data respectively.

In one embodiment the first control devices each comprise sensors and are designed to estimate a movement of the vehicle and/or a relative movement of objects relative to the vehicle and/or the vehicle position and/or the vehicle orientation based on the data of their own sensors. This makes it possible for the first control devices to estimate the movement of the vehicle independently of other control devices solely on the basis of their own sensors.

In one embodiment the first control devices are designed to control the vehicle on the basis of the first calculation results such that a collision of the vehicle with an obstacle is avoided or its intensity is reduced and/or the vehicle is prevented from leaving a traffic lane. The first control devices thus make it possible to control the vehicle in situations in which e.g. only the rapid deceleration of the vehicle is necessary.

In one embodiment the first control devices are designed to emit as calculation results environmental data relating to the surroundings of the vehicle.

In one embodiment the environmental data includes in particular occupancy grids and/or object lists and/or position data of the vehicle and/or orientation data of the vehicle. In particular, a plurality of first control devices can be provided respectively, which emit the same types of environmental data. This makes it possible to use the data of the first control devices in further logical levels.

In one embodiment the vehicle control device comprises a number of second independent control devices, which are arranged in a second logical level superordinate to the first logical level and are designed to combine similar calculation results of the first control devices and to use them as input variables for the respective vehicle control functions. The second control devices thus merge the individual data of the first control devices. However, in this case a second control device only merges similar calculation results. Similar calculation results are defined as calculation results which have a similar content, e.g. occupancy grids or object lists.

In one embodiment the second control devices are designed to control the vehicle on the basis of the respective calculation results such that the vehicle follows a predefined traffic lane. In this way the second control devices enable the partially autonomous control of the vehicle.

In one embodiment the second control devices are designed as redundant control devices, which comprise at least one redundant calculating unit and/or one redundant power supply. This increases the availability of the second control devices and thus the respective vehicle control functions.

In one embodiment the vehicle control device comprises a number of third independent control devices, which are arranged in a third logical level superordinate to the second logical level and are designed to combine the similar calculation results of the first control devices combined by the second control devices and use them as input variables for the respective vehicle control functions. The third control devices thus merge calculation results of a different kind. For example, one of the third control devices can merge the occupancy grid, object lists and position data of the vehicle.

In one embodiment the third control devices are designed to calculate, on the basis combining similar calculation results from the first control devices combined by the second control devices, an environment model for the vehicle, which includes the space available around the vehicle and which makes it possible to calculate the movement of other road users. This makes it possible to anticipate and plan the control of the vehicle and estimate the movements of other road users.

The above configurations and developments can be combined with one another as required, as long as this is advantageous. Further, possible configurations, developments and implementations of the invention also include not explicitly mentioned combinations of features of the invention described above or in the following with regard to the example embodiments. In particular, a person skilled in the art will also add individual aspects as improvements or additions to the respective basic form of the present invention.

BRIEF DESCRIPTION OF THE DRAWINGS

The present invention is explained in more detail in the following with reference to the example embodiments shown in the schematic figures of the drawings. In the latter.

DETAILED DESCRIPTION

In all of the Figures, the same or functionally identical elements and devices have been given the same reference numerals, unless otherwise indicated.

Figure 1:
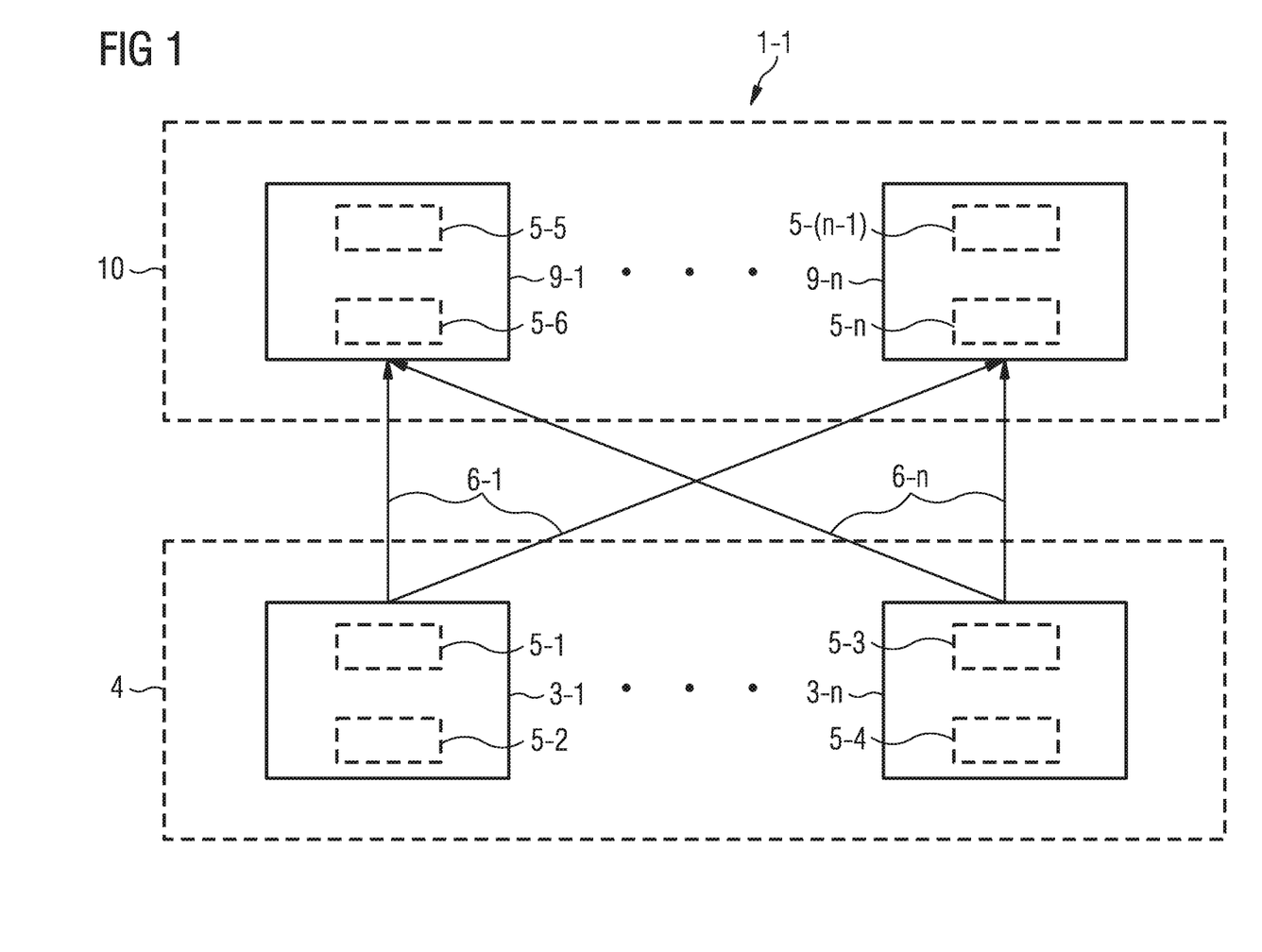
FIG. 1 shows a block diagram of an embodiment of a vehicle control device according to the invention.

FIG. 1 shows a block diagram of an embodiment of a vehicle control device 1-1 according to the invention. The vehicle control device 1-1 of FIG. 1 comprises a first logical level 4, in which a first control device 3-1 and a second control device 3-$n$ are shown, between which additional control devices are indicated by three dots.

The first control device 3-1 has two vehicle control functions 5-1, 5-2 and the second control device 3-$n$ also has two vehicle control functions 5-3, 5-4.

In a further, second logical level 10, which is arranged optically and hierarchically above the first level 4, two second control devices 9-1, 9-$n$ are shown, between which additional control devices are also shown by three dots. The control device 9-1 includes the two vehicle control functions 5-5 and 5-6, whereas the control device 9-$n$ includes the vehicle control functions 5-($n$−1) and 5-$n$.

FIG. 1 shows that the control devices 3-1 and 3-$n$ of the first logical level 4 are not interconnected and do not exchange any information with one another. Likewise, the control devices 9-1 and 9-$n$ of the second logical level 10 are not interconnected with one another and do not exchange any information with one another.

The control devices 9-1 and 9-$n$ of the second logical level 10 receive information for calculating the corresponding vehicle control functions 5-5, 5-6, 5-($n$−1) and 5-$n$ in the form of calculation results of the control devices 3-1 and 3-$n$ only from the first logical level 4.

The vehicle control functions 5-1-5-$n$ can be a number of different vehicle control functions 5-1-5-$n$. In one embodiment the control devices 3-1-3-$n$, 9-1-9-$n$, 11-1-11-$n$ can be designed to control the vehicle by means of the respective calculation results 6-1-6-$n$ and thereby in particular a lateral acceleration and/or a longitudinal acceleration of the vehicle.

For example, a possible vehicle function 5-1-5-$n$ can comprise an emergency brake, which is used simply to avoid a collision or reduce its intensity. Further vehicle control functions can include e.g. a lane-keeping function, vehicle tracking, a lateral control of the vehicle, e.g. on construction sites or in a predetermined traffic lane, trajectory planning for guiding the vehicle in complex traffic situations or the like. The calculation results 6-1-6-$n$, which are provided by the individual control devices 3-1-3-$n$ or 9-1-9-$n$, can be calculation results 6-1-6-$n$ which the individual control devices calculate in the individual calculation steps for carrying out the corresponding vehicle control functions. For example, one of the calculation results 6-1-6-$n$ can be an environment model or an occupancy grid of the environment of the vehicle, an object list for objects identified in the environment of the vehicle, the position of the vehicle or orientation data relating to the vehicle or the like.

Figure 3:
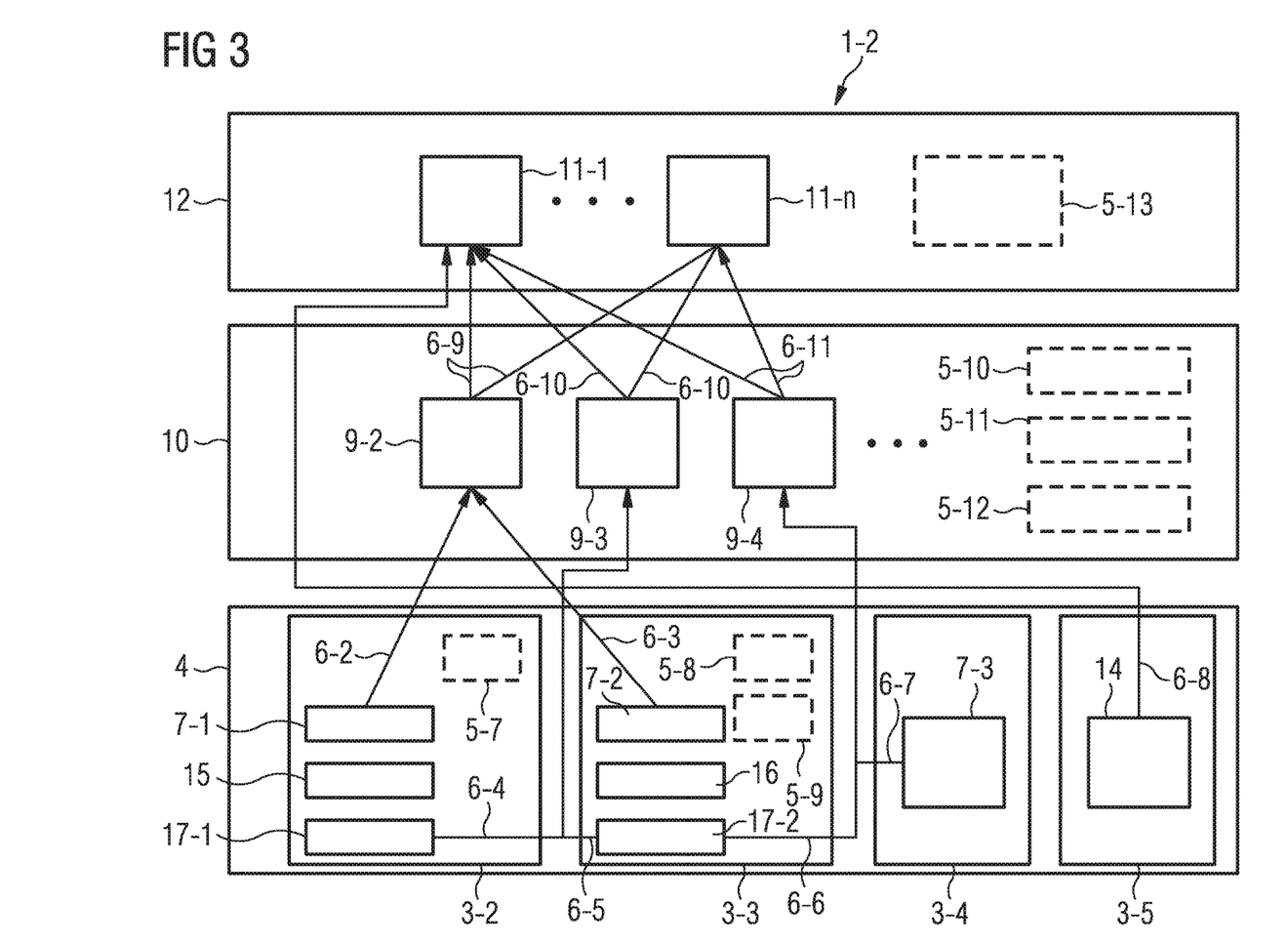
FIG. 3 shows a block diagram of a further embodiment of a vehicle control device according to the invention.

FIG. 1 shows that the environment model and functions are subdivided into several logical levels 4, 10. The representation of two logical levels 4 and 10 of FIG. 1 is given simply by way of example. In FIG. 3, for example, an embodiment is shown with three logical levels 4, 10 and 12.

On each of the logical levels there should not be any interconnection between the individual control devices 3-1-3-$n$ or 9-1-9-$n$, i.e. upon the failure of a control device 3-1-3-$n$ or 9-1-9-$n$ the other control devices 3-1-3-$n$ or 9-1-9-$n$ remain functional. In this case the control devices 3-1-3-$n$ or 9-1-9-$n$ can be designed as separate hardware, e.g. as separate control devices in a vehicle, or as separate program modules, e.g. as AUTOSAR compatible components, which are designed separately in an AUTOSAR compatible control device.

The logical levels 4, 10 can be assigned add-on vehicle control functions 5-1-5-$n$. The vehicle control functions 5-1-5-$n$ at low logical levels only have incomplete and insecure information about the vehicle surroundings which they pick up from their own sensors 7-1-7-3 (see FIG. 3), and therefore only have limited capacity. With an increasing logical level 4, 10 the data quality and thus the scope of the function and function quality increase. Due to the increasing interconnection, errors in the lower logical levels 4, 10, 12 can result in a restriction of the function. The vehicle control functions 5-1-5-$n$ can differ according to logical levels 4, 10, 12 with regard to their time of engagement. Whereas at the highest logical level 12 (see FIG. 3) a comfortable vehicle control function 5-1-5-$n$ is implemented with early engagement and e.g. low accelerations, at the lowest logical level 4 it is mainly about minimising collisions without any consideration of comfort or the consequences of the latter.

Figure 2:
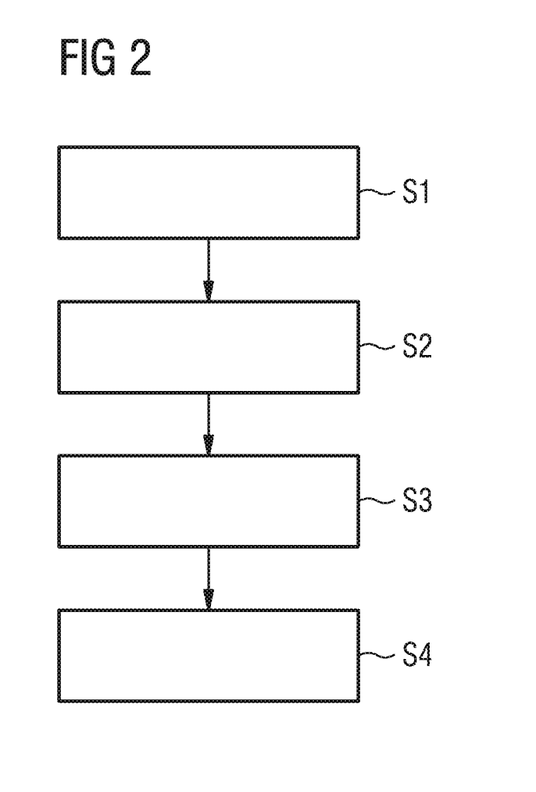
FIG. 2 shows a flowchart of an embodiment of a method according to the invention.

FIG. 2 shows a flow chart of an embodiment of a method according to the invention for controlling a vehicle.

The method includes arranging, in S1, a number of first independent control devices 3-1-3-$n$ in a first logical level 4 and calculating, in S2, predetermined first vehicle control functions 5-1-5-$n$ in the first control devices 3-1-3-$n$. Furthermore, a number of further independent control devices 9-1-9-$n$, 11-1-11-$n$ are arranged in a number of logical levels 4, 10, 12, in S3, which are superordinate to the first logical level 4 and arranged below one another hierarchically, and additional predetermined vehicle control functions 5-1-5-$n$ in the further independent control devices 9-1-9-$n$, 11-1-11-$n$ are calculated, in S4, based on the calculation results 6-1-6-$n$ of only those vehicle control functions 5-1-5-$n$ which are arranged in control devices 3-1-3-$n$, 9-1-9-$n$, 11-1-11-$n$ in logical levels 4, 10, 12, which are arranged hierarchically below the logical level 4, 10, 12 of the control device 3-1-3-$n$, 9-1-9-$n$, 11-1-11-$n$ of the respective vehicle control function 5-1-5-$n$.

The vehicle control functions 5-1-5-$n$ can be used in one embodiment to control the vehicle with the respective calculation results 6-1-6-$n$. In this case in particular a lateral acceleration and/or a longitudinal acceleration of the vehicle can be controlled.

In order to achieve a separation between the individual first vehicle control functions 5-1-5-$n$, the first vehicle control functions 5-1-5-$n$ are based only on sensor data from sensors 7-1-7-$n$ of the respective first control device 3-1-3-$n$, on which the respective vehicle control function 5-1-5-$n$ is performed. In this case in one embodiment the first vehicle control functions 5-1-5-$n$ can calculate a vehicle movement of the vehicle and/or a relative movement of objects relative to the vehicle and/or the vehicle position and/or the vehicle orientation.

The first vehicle control functions 5-1-5-$n$ can thus control the vehicle such that a collision of the vehicle with an obstacle is avoided or the intensity of the collision is reduced and/or the vehicle is prevented from leaving a traffic lane.

The first vehicle control functions 5-1-5-$n$ provide as calculation results 6-1-6-$n$ in one embodiment environmental data on the surroundings of the vehicle to the further control devices 9-1-9-$n$, 11-1-11-$n$, wherein the environmental data includes in particular occupancy grids and/or object lists and/or position data of the vehicle and/or orientation data of the vehicle.

According to the invention, the complexity of the vehicle control functions 5-1-5-$n$ can be increased in higher logical levels 10, 12. For this purpose a number of second independent control devices 9-1-9-$n$ are arranged in a second logical level 10 superordinate to the first logical level. The second control devices 9-1-9-$n$ thereby use only similar calculation results 6-1-6-$n$ of the first control devices 3-1-3-$n$ as input variables for the respective vehicle control functions 5-1-5-$n$.

In this case the second control devices 9-1-9-$n$ can already perform rudimentary comfort functions which control the vehicle e.g. based on the first calculation results 6-1-6-$n$ such that the vehicle follows a predetermined traffic lane or the like.

In one embodiment of the method a number of third independent control devices 11-1-11-$n$ are arranged in a third logical level 12 superordinate to the second logical level 10. Said third control devices 11-1-11-$n$ combine the similar calculation results 6-1-6-$n$ of the first control devices 3-1-3-$n$ combined by different second control devices 9-1-9-$n$ and use the latter as input variables for the respective vehicle control functions 5-1-5-$n$.

Whereas the second control devices 9-1-9-$n$ only merge e.g. similar calculation results 6-1-6-$n$, such as e.g. object lists, the third control devices 11-1-11-$n$ combine different types of calculation results 6-1-6-$n$, such as e.g. object lists, occupancy grids and vehicle orientation information.

The third control devices 11-1-11-$n$ can calculate, on the basis of this combination of similar calculation results 6-1-6-$n$ merged by the second control devices 9-1-9-$n$, an overall environment model of the vehicle, which identifies the space available around the vehicle and makes it possible to calculate the movement of other road users. It is thus possible for the third control devices 11-1-11-$n$ to plan complex movements of the vehicle in complex situations.

FIG. 3 shows a block diagram of a further embodiment of a vehicle control device 1-2 according to the invention.

The vehicle control device 1-2 of FIG. 3 is based on vehicle control device 1-1 of FIG. 1 and comprises three logical levels 4, 10 and 12. In the first logical level 4 four first control devices 3-2-3-5 are shown. The second logical level 10 is shown above the first logical level 4 and comprises three second control devices 9-2-9-4. In the third logical level 12, which is arranged above the second logical level 10, two third control devices 11-1-11-$n$ are shown. Different numbers of control devices are possible on all levels.

The first control device 3-2 is a radar system 3-2, which comprises a radar sensor 7-1 or a network of radar sensors 7-1. The first control device 3-3 is a camera-based control device 3-3, which comprises a camera 7-2 as a sensor 7-2.

The first control device 3-4 is a localisation control device 3-4, which can locate the vehicle. For this purpose it comprises as a sensor 7-3 e.g. a GPS sensor, an inertial sensor and/or an odometry sensor. Lastly, the first control device 3-5 is designed as a back-end which can provide e.g. card data 14. The back-end 3-5 can be a local back-end 3-5 in the vehicle or a central back-end 3-5 reachable via a network.

In the first logical level 4 the individual first control devices 3-2-3-5 or the sensors 7-1-7-3 are not interlinked with one another. As a result, a request is made that each of the control devices 3-2-3-5 or sensors 7-1-7-3 has to estimate or calculate the vehicle movement from its own data. For the radar system 3-2 e.g. a SLAM approach (Simultaneous Localization and Mapping) 15 can be used which tracks static radar clusters. In one embodiment an add-on vehicle control function 5-7 can be e.g. collision avoidance or an emergency brake.

For the camera-based control device 3-3 it is possible to use e.g. a visual odometry approach 16 based on optical flow. Add-on vehicle control functions 5-8, 5-9 can include in one embodiment e.g. collision avoidance or an emergency brake or lane departure prevention or a lane keeping function.

Furthermore, the first control devices 3-2, 3-5 can carry out object recognition 17-1, 17-2 based on the respective sensor data.

The said examples of vehicle control functions 5-7-5-9 do not ensure comfortable driving and cannot prevent a collision in every case, but are still available on the disconnection of the data sources, even when several components of the vehicle control device 1-2 have failed and are used to continue to control the vehicle when the driver is late taking over or fails to take over when the autonomous driving function has failed.

The vehicle control functions 5-7-5-9 are partitioned in one embodiment on the control devices or control devices 3-2-3-5, which provide the required data. Thus hardware and software disconnection is assured.

The vehicle control functions 5-7-5-9 on the first logical level 4 form the bottom level. The vehicle control functions 5-7-5-9 can therefore be configured so that they are only triggered in cases of very reliable recognition. Furthermore, the vehicle control functions 5-7-5-9 can be provided in the plural, e.g. an emergency brake can be performed on the basis of radar and on the basis of a camera.

The control devices 3-2-3-5 provide the data or calculation results respectively of the sensors 7-1, 7-2 and 7-3 or the radar SLAM 15, the visual odometry 16 or the object recognitions 17-1, 17-2 to the second control devices 9-2-9-4.

The second control device 9-2 is a control device 9-2 which merges occupancy grids, which are provided by the first control device 3-2 and the first control device 3-3. The second control device 9-3 is a control device 9-3, which merges objects which are provided by the first control device 3-2 and the first control device 3-3. The second control device 9-4 is a control device 9-4, which performs a landmark-based localisation of the vehicle based on the visual odometry of the first control device 3-3 and the data of the control device 3-4.

Then on the second logical level 10 there is a merging of the same input data, i.e. for example occupancy grids or object lists from several first control devices 3-2-3-5 are merged together. This results in increased interlinking and thus a greater dependency of the modules between one another. By merging similar data, the latter is reduced to the required minimum. Thus no sensor data for the positioning is included in the merging of the occupancy grids.

The estimation of the position takes place in one embodiment on the integration of a new occupancy grid by means of so-called registration methods, by means of which the optimal alignment of the occupancy grid is determined in the merged occupancy grid.

Similarly, during the object fusion the position is determined from object matching e.g. by an extended Kalman filter SLAM and then an estimate of the state of the objects is made. As with the first logical level 4, vehicle control functions 5-10-5-12, which have an improved data basis, can be added to the data of the second logical level 10. A vehicle control function 5-10-5-12 of this kind can be e.g. an improved lateral control of the vehicle, which also reacts to raised objects. By means of the latter, a lateral control can be performed e.g. on building sites. If the camera is faulty or there are no road markings it is thus possible to prevent the vehicle leaving the traffic lane. It is also possible to apply heuristics in order to get the vehicle to drive in the right area, in that it is recognised for example in the right third of the free area. At this logical level the first control devices 3-2-3-5 are interlinked with one another so that if individual first control devices 3-2-3-5 are faulty or not working the functionality can be restricted, however there is no linking of the individual algorithms. As in addition different first control devices 3-2-3-5 supply similar input data or calculation results 6-2-6-8 (the data are the same kind, there are differences in the field of vision and precision), if one of the first control devices 3-2-3-5 fails there is a limit to the data quality but a basic function is still ensured.

If one of the second control devices 9-2-9-4 fails the other second control devices 9-2-9-4 can still be used, so that although some vehicle control functions 5-10-5-12 are not functioning the whole system is not completely affected.

Therefore, in one embodiment the vehicle control functions 5-10-5-12 on the second logical level 10 are performed on a highly available or redundant control device.

The third control device 11-1 and the third control device 11-n receive all calculation results 6-9-6-11 from the second control devices 9-2-9-4. Furthermore, the third control device 11-1 and the third control device 11-n can also receive calculation results 6-2-6-8 from the first control devices 3-2-3-5. This is shown in FIG. 3, for example, for the card data 14 of the first control device 3-5.

At the third logical level 12, relationships are formed between the individual data sources. For example, the space currently available for manoeuvring can be calculated from at least one occupancy grid, at least one object list and card data or it can be concluded from the object list and card data how other road users are likely to behave.

At the third logical level 12, there is thus a virtually comprehensive description of the situation with a high level of understanding of the scene. This enables vehicle control functions 5-13, such as e.g. planning and executing complex manoeuvres such as changing lanes and a comfortable, long-range forward planning of the vehicle movement.

The high degree of interconnection of the modules ensures that in particular in the case of errors in individual algorithms (e.g. the occupancy grid-fusion is not available due to an error) the vehicle control functions 5-13 on the third logical level 12 are no longer available.

In this case, however, at least partly there are still vehicle control functions 5-10-5-12 on the second logical level 10 and, depending on the fault, the full extent of the first logical level 4 is available so that collision-free driving is made possible.

For example, no more lane changing can be performed or no situations involving high braking deceleration, but the vehicle can e.g. follow the current lane without collision.

Although the present invention has been described above with reference to preferred embodiments, it is not restricted to the latter but can be modified in many different ways. In particular, the invention can be changed or modified in many different ways without deviating from the core concept of the invention.

The invention claimed is:

1. A control device for a vehicle, comprising:
a plurality of first control devices independent of one another arranged in a first logical level and designed to calculate predetermined first vehicle control functions and to output first calculation results;
a plurality of further control devices independent of one another arranged in a plurality of logical levels superordinate to the first logical level and below one another hierarchically and designed to calculate predetermined additional vehicle control functions and to output additional calculation results; and
wherein the further control devices are designed to use calculation results of only those control devices as input variables for the corresponding vehicle control functions, which are arranged in logical levels, which are arranged hierarchically below the logical level of the respective control device; and
wherein the control devices are designed to control the vehicle by the respective calculation results.

2. The control device of claim 1, wherein the respective calculation results are at least one of a lateral acceleration and a longitudinal acceleration of the vehicle.

3. The control device of claim 1, wherein the first control devices each comprise sensors designed to estimate at least one of:
a vehicle movement of the vehicle;
a relative movement of objects relative to the vehicle;
the vehicle position; and
the vehicle orientation on the basis of the data of their own sensors.

4. The control device of claim 3, wherein the first control devices are designed to control the vehicle on the basis of the first calculation results, such that at least one of:
a collision of the vehicle with an obstacle is avoided;
a collision intensity is reduced; and
it is not possible for the vehicle to leave a traffic lane.

5. The control device of claim 1, wherein the first control devices output environmental data on the surroundings of the vehicle as calculation results;
wherein the environmental data comprises at least one of: occupancy grids, object lists, position data of the vehicle, and orientation data of the vehicle.

6. The control device of claim 1, wherein a number of second independent control devices, which are arranged in a second logical level superordinate to the first logical level and are designed to combine similar calculation results of the first control devices and use them as input variables for the respective vehicle control functions.

7. The control device of claim 6, wherein the second control devices are designed to control the vehicle on the basis of the respective calculation results such that the vehicle follows a predetermined traffic lane.

8. The control device of claim 6, wherein the second control devices are designed as redundant control devices which have at least one of: a redundant calculation unit and a redundant power supply.

9. The control device of claim 6, wherein a number of third control devices independent of one another, which are arranged in a third logical level superordinate to the second logical level and are designed to combine the similar calculation results of the first control devices combined by the second control devices and use them as input variables for the respective vehicle control functions.

10. The control device of claim 9, wherein the third control devices are designed, on the basis of the combination of similar calculation results of the first control devices combined by the second control devices, to calculate an environment model of the vehicle, which includes the space available around the vehicle and which makes it possible to calculate the movement of other road users.

11. A method for controlling a vehicle comprising:
arranging a number of first control devices independent of one another in a first logical level;
calculating predefined first vehicle control functions in the first control devices and outputting corresponding calculation results;
arranging a number of further independent control devices in a number of logical levels superordinate to the first logical level and arranged below one another hierarchically; and
calculating further predefined vehicle control functions in the further independent control devices based on the calculation results of only those vehicle control functions which are arranged in control devices in logical levels, which are arranged hierarchically below the logical level of the control device of the respective vehicle control function;
wherein the vehicle control functions control the vehicle with the respective calculation results.

12. The method of claim 11, wherein the vehicle control functions control at least one of: a lateral acceleration and a longitudinal acceleration of the vehicle.

13. The method of claim 11, further comprising:
basing the first vehicle control functions on the sensor data of sensors of the respective first control device, on which the respective vehicle control function is performed, each sensor estimating at least one of: a vehicle movement of the vehicle; a relative movement of objects relative to the vehicle; the vehicle position; and the vehicle orientation on the basis of the data of their own sensors
controlling the vehicle with the first vehicle control functions such that at least one of: a collision of the vehicle with an obstacle is avoided; a collision intensity is reduced; and it is not possible for the vehicle to leave a traffic lane; and
outputting as calculation results environmental data about the surroundings of the vehicle from the first vehicle control functions, wherein the environmental data comprises at least one of: occupancy grids, object lists, position data of the vehicle, and orientation data of the vehicle.

14. The method of claim 11, wherein a number of second independent control devices are arranged in a second logical level superordinate to the first logical level, which combine similar calculation results of the first control devices and use them as input variables for the respective vehicle control functions;
wherein the second control devices control the vehicle based on the first calculation results in particular such that the vehicle follows a predetermined traffic lane.

15. The method of claim 14, wherein a number of third independent control devices are arranged in a third logical level superordinate to the second logical level, which combine similar calculation results of the first control devices combined by the second control devices and use them as input variables for the respective vehicle control functions; and wherein the third control devices based on the combination of similar calculation results of the first control devices combined by the second control devices calculate an environment model of the vehicle, which includes the space available around the vehicle and makes it possible to calculate the movement of other road users.

* * * * *